Figure 1:
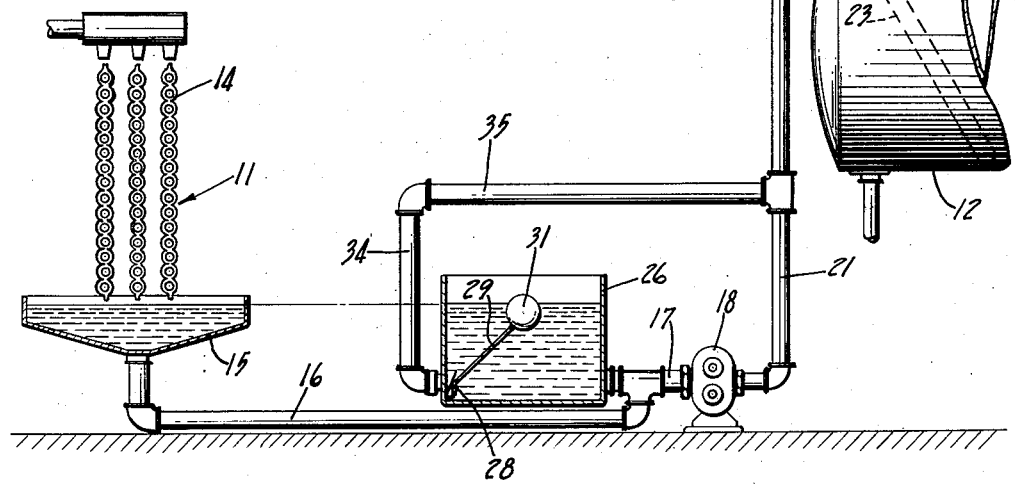

Aug. 1, 1944.  W. McK. MARTIN  2,354,693
LIQUID CONTROL SYSTEM
Filed Dec. 13, 1941

INVENTOR.
William McK. Martin
BY Ivan D. Thornburgh
Charles H. Erne
ATTORNEYS

Patented Aug. 1, 1944

2,354,693

UNITED STATES PATENT OFFICE 2,354,693

LIQUID CONTROL SYSTEM

William McK. Martin, Maywood, Ill., assignor to American Can Company, New York, N. Y., a corporation of New Jersey Application December 13, 1941, Serial No. 422,918

4 Claims. (Cl. 103—41)

The present invention relates to an apparatus for conveying through pipe lines liquids that have a tendency to foam when agitated in the presence of air and has particular reference to maintaining the pipe lines free of entrained air and foam.

In handling certain kinds of liquid products, homogenized milk for example, it has been found that excessive foaming sometimes takes place due to entrainment of air as the liquid flows from one place to another. In dairies, homogenized milk is usually passed through a cooler and pumped through supply lines to a suitable storage tank from which it is drawn as required for filling into containers.

The coolers usually receive the milk in batches at more or less irregular periods of time. The pump must be operated for peak load of the cooler and in order to insure against inadequate pump capacity it is necessary that the pump operate at a speed which will give a pump flow slightly in excess of the normal cooler flow. As a result there are times when the pump completely drains the cooler and thereby draws air into the supply lines. This air becomes entrained in the milk and it has been found that it is this entrained air that forms the foam in the lines and causes considerable difficulty.

The instant invention contemplates overcoming this difficulty by providing devices for regulating the level of the milk entering the supply line from the cooler by recirculating the milk when this cooler level approaches the low danger level. This is done automatically by passing the milk through a by-pass supply line to keep the milk in the line in motion without lowering its surface level, thus preventing aeration of the milk in the line.

An object therefore is the provision of devices for preventing aeration of liquid pumped through a supply line wherein a float valve and a continuously operating pump drawing liquid from a source of supply through a pipe line by-passes the liquid through a return pipe line when the liquid at the source falls to a predetermined low level so that this low level will not be lowered further thereby preventing the entrance of air into the line at the liquid source.

Numerous other objects and advantages of the invention will be apparent as it is better understood from the following description, which, taken in connection with the accompanying drawing, discloses a preferred embodiment thereof.

Figure 2:
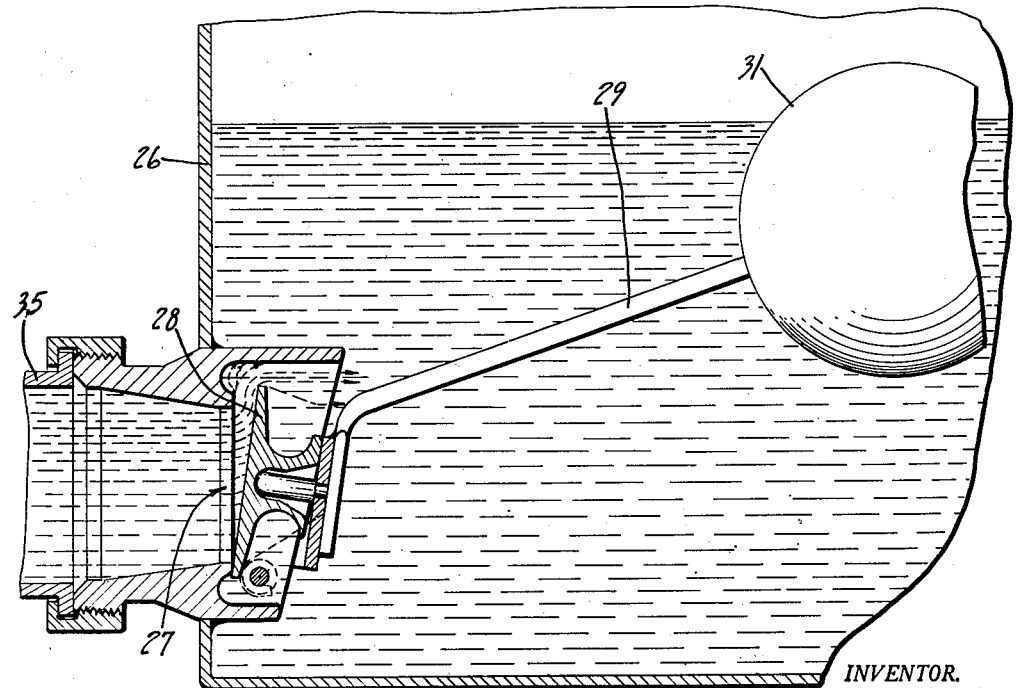

Referring to the drawing:

Figure 1 is a schematic view illustrating an apparatus embodying the instant invention, with parts broken away and parts shown in section; and Fig. 2 is an enlarged sectional view through a portion of a float tank having a float valve used in the apparatus.

As a preferred embodiment of the invention the drawing illustrates a pipe line for conveying homogenized milk from a cooling device 11 to a storage reservoir 12 from which it may be used as required for filling into containers. In this apparatus, milk introduced at various times into the cooling device flows down over corrugated surfaces 14 through which a suitable cooling medium is circulated. The cooled milk runs off the bottom of the cooling surface structure and is caught in a drip trough 15 located therebeneath.

The bottom of the drip trough 15 is connected by a horizontal supply line 16 to a larger diameter feed pipe 17. One end of the feed pipe 17 is connected to a rotary pump 18 which is continuously operated in any suitable manner. The discharge side of the pump is connected by a vertical discharge supply pipe 21 which merges into a horizontal supply pipe 22 connected to a side of the storage reservoir 12 near the top thereof. A pipe 23 which is a continuation of the pipe 22 is disposed inside the reservoir and leads to a place of discharge for the milk near the bottom of the reservoir. These pipes 21, 22, 23 are of the same diameter as the main supply pipe 16.

Hence milk from the cooler drip trough 15 flows through the main supply pipe 16 into the feed pipe 17 and is forced by the pump 18 up through the pipes 21, 22, 23 into the storage reservoir 12 for use as hereinbefore explained.

Provision is made for stopping this flow of milk when the milk in the drip trough 15 reaches a predetermined low level. For this purpose the feed pipe 17 at its end opposite the pump 18 is connected into a side of a float tank 26, the feed pipe being connected to the tank near its bottom. The opposite side of the float tank, near its bottom, is formed with a pipe opening 27 which is normally closed by a hinged valve 28.

The valve 28 is attached to an actuating rod 29 carrying a ball float 31 which rides on the surface of the milk in the float tank. The float tank at its pipe opening 27 is connected by a vertical by-pass pipe 34 and a continuing horizontal by-pass pipe 35, to the vertical discharge pipe 21, as shown in the drawing. These by-pass pipes are of the same diameter as the supply pipe 16 and the discharge pipes 21, 22, 23.

With this construction of apparatus, milk from the cooler drip trough 15 fills the float tank 26 to the same level as the milk in the trough. With the milk in the trough at high level the ball float 31 in the float tank keeps the valve 28 closed. Although the by-pass pipes 34, 35 are filled with milk at all times, the closed valve 28 prevents its circulation through the pipes. Hence normally, the pump 18 only forces the milk from the drip trough up through the supply pipes 21, 22, 23 into the storage tank.

However, as the milk level in the drip trough 15 recedes, the milk level in the float tank 26 also recedes and this permits the ball float to fall and thus open the valve 28. When this valve is open, the milk in the by-pass pipes 34, 35 flows down into the float tank while the pump continues operating. This opens the by-pass system and as the pump continues to operate it draws the milk from the float tank instead of the drip trough and forces it up the discharge pipe 21, where it flows through the path of least resistance, which path is through the by-pass pipes.

Hence the milk continues circulating through the float tank 26, pump 18, discharge pipe 21, and by-pass pipes 34, 35 without drawing any of the milk from the main supply line 16. In this manner the low level of the milk in the cooler drip trough 15 is maintained at a level above the outlet of the trough, i. e., the entrance to the main supply line, and hence air is prevented from entering the line and is prevented from becoming entrained in the milk. It is this action that prevents foam from being formed and from being drawn down into the pipe lines.

When the level of the milk in the cooler drip trough 15 again is raised by the addition of more milk to the cooler, this milk raises the level of the milk in the float tank 26. Raising of the milk level in the tank lifts the ball float 31 and this closes the valve 28. Closing of the valve stops the circulation of the milk through the by-pass pipes 34, 35 and thus the milk forced through the discharge pipe 21 from the main supply line 15, flows over into the storage reservoir 12.

Thus the cutting-in and the cutting-out of the by-pass feature of the apparatus is effected automatically as the pump continues to operate and hence the maintaining of the low milk level in the cooler drip trough 15 is effected without any attention from the operator.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. In a pipe line system for conveying a liquid from one place to another, the combination of a trough having an outlet from which the liquid is drawn, a pump connecting with said trough outlet for removing liquid from said trough at a rate of flow in excess of that of the liquid entering the trough, a storage tank located above said trough and connected with said pump for receiving the liquid from said pump and from said trough, and means for by-passing the liquid between said tank and said pump and for returning it to the pump when the liquid in said trough reaches a predetermined low level whereby said pump is operated continuously without further reducing the said predetermined low level in said trough.

2. In a pipe line system for conveying milk or the like liquid from one place to another, the combination of a trough having an outlet from which the milk is drawn, a main supply pipe line connecting with said trough outlet, a continuously operating pump connecting with said main pipe line, a discharge pipe line connecting with said pump, a storage tank located above said pump for receiving milk from the pump by way of said discharge pipe line, a by-pass line connecting with said discharge pipe line and with said main pipe line, and a valve in said by-pass line adapted to open when the liquid in the trough falls below a predetermined level, thereby setting up a temporary circulation of the milk by the pump through the by-pass means as long as the milk in the trough remains below said level to prevent further lowering of liquid in the trough and to prevent air from entering the pipe lines and becoming entrained in the milk.

3. In a pipe line system for conveying milk from one place to another, the combination of a trough having an outlet from which milk is drawn, a main supply pipe line connecting with said trough outlet, a continuously operating pump connecting with said main pipe line, a discharge pipe line connecting with said pump, a storage tank located above said pump for receiving milk therefrom by way of said discharge pipe line, a float tank also connecting with said pump, a by-pass pipe line connecting with said discharge pipe line and with an inlet opening in said float tank, and a float actuated valve in said float tank and normally closing off the inlet opening in the float tank, said float tank being in communication with said main pipe line and maintaining milk from said trough at a level of the milk in the trough, said float actuated valve operating to open the inlet into the float tank when the milk in the trough falls to a predetermined low level to permit of the circulation of the milk in the float tank through the by-pass pipe line while holding the milk in the trough against receding below its low level to maintain the outlet of the trough covered with milk so that air will be prevented from entering the pipe lines and from becoming entrained in the milk.

4. In a pipe line system for conveying milk or other liquid, the combination of a trough receiving a substantially continuous flow of milk and having an outlet from which the milk is withdrawn, a supply pipe line connecting with said outlet, a pump connecting into said pipe line and adapted to transfer the milk from the trough through said line to a point above said trough, a by-pass leading from the discharge side of said pump to said trough, a valve normally closing said by-pass and adapted to open when the liquid in said trough falls below a predetermined level, thereby to permit recirculation of milk through said by-pass as long as the milk in said trough remains below said predetermined level.

WILLIAM McK. MARTIN.